United States Patent
Vachuska et al.

(10) Patent No.: US 10,135,744 B2
(45) Date of Patent: *Nov. 20, 2018

(54) PRIORITIZING AT LEAST ONE FLOW CLASS FOR AN APPLICATION ON A SOFTWARE DEFINED NETWORKING CONTROLLER

(71) Applicant: HEWLETT-PACKARD DEVELOPMENT COMPANY, L.P., Houston, TX (US)

(72) Inventors: Thomas Vachuska, Roseville, CA (US); Simon Hunt, Roseville, CA (US); Uyen Chau, Roseville, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/117,460

(22) PCT Filed: Apr. 3, 2014

(86) PCT No.: PCT/US2014/032868
§ 371 (c)(1),
(2) Date: Aug. 9, 2016

(87) PCT Pub. No.: WO2014/165697
PCT Pub. Date: Oct. 9, 2014

(65) Prior Publication Data
US 2016/0366062 A1  Dec. 15, 2016

(51) Int. Cl.
*H04L 12/851* (2013.01)
*H04L 12/64* (2006.01)
(Continued)

(52) U.S. Cl.
CPC ...... *H04L 47/2441* (2013.01); *H04L 12/6418* (2013.01); *H04L 45/38* (2013.01);
(Continued)

(58) Field of Classification Search
CPC ......... H04L 45/02; H04L 45/38; H04L 45/42; H04L 45/64; H04L 41/0813;
(Continued)

(56) References Cited

U.S. PATENT DOCUMENTS

2012/0155264 A1  6/2012  Sharma et al.
2013/0044582 A1  2/2013  Faheem
(Continued)

FOREIGN PATENT DOCUMENTS

JP  2013-030863 A  2/2013
WO  WO-2012/130264 A1  10/2012

OTHER PUBLICATIONS

Ahmed Khurshid et al., "VeriFlow: Verifying Network-Wide Invariants in Real Time," Mar. 8, 2013, pp. 15-27, USENIX Association, Available at: <web.engr.illinois.edu/~wzhou10/nsdi13-veriflow.pdf>.
International Search Report and Written Opinion, International Application No. PCT/US2014/032868, dated Aug. 19, 2014, pp. 1-7, KIPO.
Phillip Porras et al., "A Security Enforcement Kernel for OpenFlow Networks," Aug. 13, 2012, pp. 1-6, ACM, Available at: <http://www.csl.sri.com/users/vinod/papers/fortnox.pdf>.
(Continued)

*Primary Examiner* — Peter Chen
(74) *Attorney, Agent, or Firm* — Rathe Lindenbaum LLP (57) ABSTRACT

Prioritizing at least one flow class for an application on a software defined networking (SDN) controller includes registering flow classes for an application with a SDN controller, determining, with the SDN controller, a priority for each of the flow classes based on other installed applications and network services on the SDN controller, receiving, from the
(Continued)

application, at least one flow modification rule using a priority key as the priority, and validating the at least one flow modification rule against registered parameters of at least one of the flow classes of the application to determine a flow of traffic based on the priority.

18 Claims, 5 Drawing Sheets

(51) Int. Cl.
    *H04L 12/721* (2013.01)
    *H04L 12/715* (2013.01)
    *H04L 12/717* (2013.01)
    *H04W 72/10* (2009.01)

(52) U.S. Cl.
    CPC .............. *H04L 45/42* (2013.01); *H04L 45/64* (2013.01); *H04L 47/2433* (2013.01); *H04W 72/10* (2013.01)

(58) Field of Classification Search
    CPC ............. H04L 41/0816; H04L 41/0893; H04L 12/6418; H04L 47/10; H04L 47/125; H04L 47/2441; H04L 47/2433; H04L 47/2483; H04L 47/24; H04W 72/10; H04W 28/02; H04W 28/10
    See application file for complete search history.

(56) References Cited

U.S. PATENT DOCUMENTS

| | | |
|---|---|---|
| 2013/0044764 A1 | 2/2013 | Casado et al. |
| 2013/0124707 A1* | 5/2013 | Ananthapadmanabha ................ H04L 45/7457 709/223 |
| 2013/0329601 A1 | 12/2013 | Yin et al. |
| 2014/0052836 A1* | 2/2014 | Nguyen ................ H04L 45/306 709/223 |
| 2014/0075519 A1* | 3/2014 | Porras ..................... H04L 63/20 726/4 |
| 2015/0026313 A1* | 1/2015 | Chawla ................... H04L 47/24 709/220 |
| 2015/0063144 A1* | 3/2015 | Kozat .................. H04W 24/02 370/252 |

* cited by examiner

PRIORITIZING AT LEAST ONE FLOW CLASS FOR AN APPLICATION ON A SOFTWARE DEFINED NETWORKING CONTROLLER

RELATED APPLICATIONS

The present application relates to International Patent Application No. PCT/US2014/032868 filed Apr. 3, 2014, entitled "Modifying a Priority for at Least One Flow Class of an Application," which is incorporated herein by reference in its entirety.

BACKGROUND

A software-defined networking (SDN) network allows network administrators to orchestrate and automate control of network services, such as network components and applications through abstraction of a lower level functionality. A SDN controller in the SDN network makes decisions about how network traffic is processed by instructing switches within the SDN network to define forwarding behavior of data packets traveling across the SDN network according to priorities set by high-level policy or business logic.

BRIEF DESCRIPTION OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

As mentioned above, the SDN network allows network administrators to orchestrate and automate control of network services, such as network components and applications through abstraction of a lower level functionality. Further, a number of applications and network services may be installed on the SDN controller. In one example, the applications may include a priority to define forwarding behavior of data packets traveling across the SDN network according to the priority for the application. Based on the priority, the SDN controller in the SDN network makes decisions about how network traffic is processed by instructing switches within the SDN network.

Although a number of applications and network services may be installed on the SDN controller, the applications are not aware of each other on the SDN controller. Since the applications are not aware of each other on the SDN controller, the applications are not able to account for each other's business logic. As a result, applications may have the same priority. This may result in conflicting priorities when multiple applications are making flow table modifications, such as flow modification rules, that are to be installed at the switches.

The principles described herein include a method for prioritizing at least one flow class for an application on a SDN controller. Such a method includes registering flow classes for an application with a SDN controller, determining, with the SDN controller, a priority for each of the flow classes based on other installed applications and network services on the SDN controller, receiving, from the application, at least one flow modification rule using a priority key as the priority, and validating the at least one flow modification rule against registered parameters of at least one of the flow classes of the application to determine a flow of traffic based on the priority. Such a method allows an application to request flow modification rules for a switch without the request conflicting with other applications installed on the SDN controller.

In the present specification and in the appended claims, the term "SDN network" is meant to be understood broadly as a combination of hardware and software that includes a SDN controller, a number of switches, routers, wireless access points, and instructions is processed by the switches, routers, and wireless access points to define the forwarding behavior of data packets. Further, the term switch can apply equally to a wide area network (WAN) router, wireless access point, or other SDN networking device. In one example, the SDN controller in the SDN network makes decisions about how network traffic is processed by instructing switches within the SDN network to define the forwarding behavior of data packets traveling across the SDN network.

In the present specification and in the appended claims, the term "flow class" is meant to be understood broadly as a description of flow modification rules an application requests from a SDN controller and a priority at which the flow modification rules are to be installed at a switch. In one example, the flow modification rules may include how traffic flows in a SDN network. For example, the flow modification rules may describe how to forward packets of data from one node to another node.

In the present specification and in the appended claims, the term "priority" is meant to be understood broadly as an order of evaluation for flow modification rules at a switch. In one example, the higher the priority the earlier the flow modification rules is executed at the switch. In one example, the priority may be a range from 0 to 10, where 0 indicates the lowest priority and 10 indicates the highest priority. In another example, the priority may be expressed symbolically. For example, a priority with the lowest significance may be assigned a low priority. A priority with the highest significance may be assigned a high priority.

In the present specification and in the appended claims, the term "priority key" is meant to be understood broadly as a ticket that the application includes when sending a request for a flow modification rule. In one example, the priority key may be used to identify a user who owns a particular flow class, lookup appropriate metadata, or combinations thereof.

Further, as used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Figure 1:
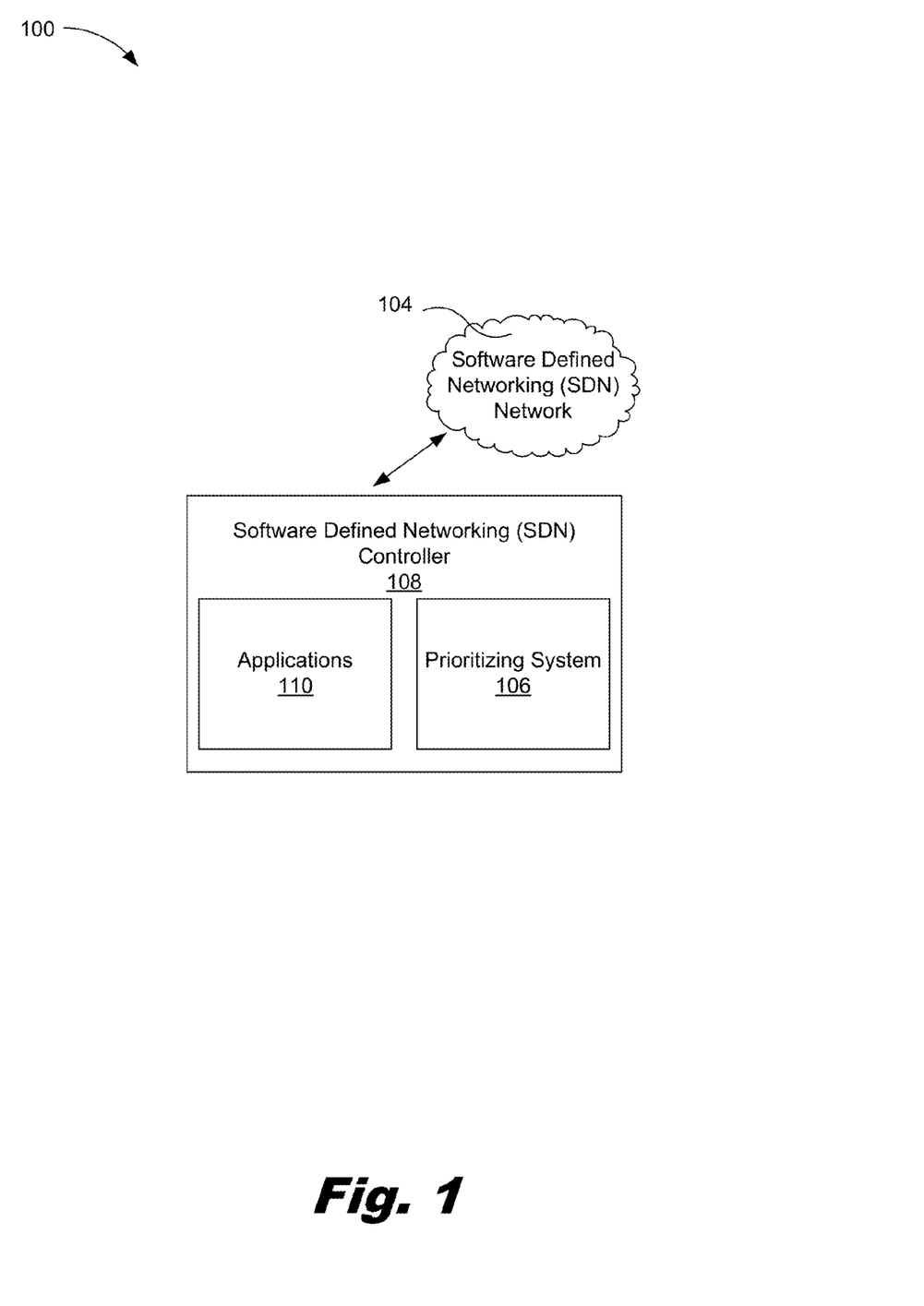
FIG. 1 is a diagram of an example of a system for prioritizing at least one flow class for an application on a SDN controller, according to one example of principles described herein.

Referring now to the figures, FIG. 1 is a diagram of an example of a system for prioritizing at least one flow class for an application on a SDN controller, according to one example of principles described herein. As will be described below, a prioritizing system is in communication with a network to register flow classes for an application with a SDN controller. Further, the prioritizing system determines, with the SDN controller, a priority for each of the flow classes based on other installed applications and network services on the SDN controller. Further, the prioritizing system validates at least one flow modification rule against registered parameters of at least one of the flow classes of the application to determine a flow of traffic based on the priority.

As illustrated in FIG. 1, the system (100) includes a SDN controller (108). As will be described in other parts of this specification, the SDN controller (108) makes decisions about how network traffic is processed by instructing switches within the SDN network (104) to define the forwarding behavior of data packets traveling across the SDN network (104). In one example, the SDN controller (108) has a global view of the SDN network (104). For example, the SDN controller (108) may have a global view of the topology of the SDN network (104), the switches within the SDN network (104), user devices within the SDN network (104), other global views, or combinations thereof. As a result, the SDN controller (108) may forward data packets traveling across the SDN network (104) in an appropriate manner.

In one example, a number of applications (110) and network services may be installed on the SDN controller. The applications (110) may include priorities to define forwarding behavior of data packets traveling across the SDN network (104). Based on the priority for each of the applications (110), the SDN controller (108) in the SDN network (104) makes decisions about how network traffic is processed by instructing switches within the SDN network (104) to define forwarding behavior of data packets traveling across the SDN network (104). More information about the applications will be described in later parts of this specification.

As illustrated, the system (100) further includes a prioritizing system (106). As will be described in other parts of this specification the prioritizing system (106) prioritizes at least one flow class for an application on the SDN controller.

The prioritizing system (106) registers flow classes for the applications (110) with the SDN controller (108). By registering the flow classes for the applications (110) with the SDN controller (108), the applications (110) may be able to account for each other's business logic.

The prioritizing system (106) determines, with the SDN controller (108), a priority for each of the flow classes based on other installed applications and network services on the SDN controller (108). As a result, each of the applications (110) may be assigned a priority that will not conflict with another application's priority when a request for a flow modification rule is made. In one example, the request may be made as a flow modification message.

The prioritizing system (106) sends the priority key associated with the priority from the SDN controller (108) to one of the applications (110). As will be described in other parts of this specification the priority key may be a ticket that the application includes when sending a request for a flow modification rule. In one example, the priority key may be used to identify a user who owns a particular flow class, lookup appropriate metadata, or combinations thereof.

Further, the prioritizing system (106) receives, from the one of the applications (110), at least one flow modification rule using a priority key as the priority. In one example, the prioritizing system (106) receives, from one of the applications (110), at least one flow modification rule using a priority key as the priority when a request is made.

The prioritizing system (106) validates the at least one flow modification rule against registered parameters of at least one of the flow classes of the applications (110) to determine a flow of traffic based on the priority. In one example, the prioritizing system (106) approves the at least one flow class of one of the applications (110) or prohibits the at least one flow modification rule of one of the applications (110).

As a result, prioritizing system (106) prioritizes at least one flow class for an application on the SDN controller (108) such that an application may make a request for flow modification rules for a switch without the request conflicting with other applications installed on the SDN controller. More information about the prioritizing system (106) will be described later on in this specification.

While this example has been described with reference to the prioritizing system being located on the SDN controller, the prioritizing system may be located in any appropriate location according to the principles described herein. For example, the prioritizing system may be located in a user device, a server, a datacenter, over the network, other locations, or combinations thereof.

Further, while this example has been described with reference to the SDN controller being located over the network, the SDN controller may be located in any appropriate location. For example, the SDN controller may be located in the SDN network, in a datacenter, the prioritizing system, other locations, or combinations thereof. Still further, while this example has been described with reference to the system including one SDN controller, the system may include several SDN controllers. For example, the system may include three SDN controllers.

While this example has been described with reference to the applications being installed on the SDN controller, the applications may be installed in any appropriate location. For example, the applications may be installed on a user device, a server, a datacenter, over the network, other locations, or combinations thereof. As a result, the applications may be installed externally or internally to the SDN controller.

Figure 2:
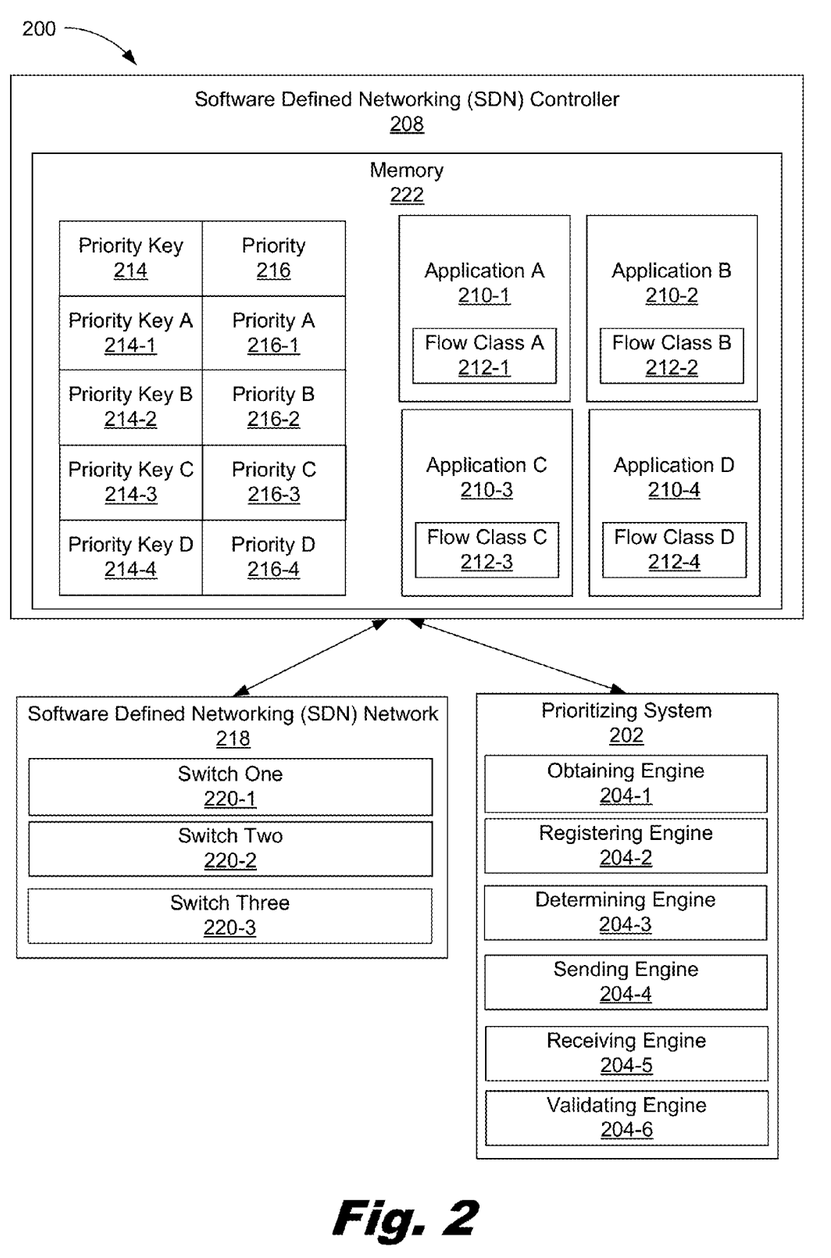
FIG. 2 is a diagram of an example of a system for prioritizing at least one flow class for an application on a SDN controller, according to one example of principles described herein.

FIG. 2 is a diagram of an example of a system for prioritizing at least one flow class for an application on a SDN controller, according to one example of principles described herein. As mentioned above, a prioritizing system is in communication with a network to register flow classes for an application with a SDN controller. Further, the prioritizing system determines, with the SDN controller, a priority for each of the flow classes based on other installed applications and network services on the SDN controller. Further, the prioritizing system validates at least one flow modification rule against registered parameters of at least one of the flow classes of the application to determine a flow of traffic based on the priority.

As illustrated in FIG. 2, the system (200) includes an SDN controller (208). As mentioned above, a number of applications (210) and network services may be installed on the SDN controller (208) in memory (222). In other examples, the applications (210) may be installed externally to the SDN controller (208). As illustrated, the SDN controller (208) includes four applications (210), namely application A (210-1), application B (210-2), application C (210-3), and application D (210-4).

In one example, the SDN controller (208) brokers priorities, such as OpenFlow rule priorities, for the applications (210) by having the applications (210) define their intent via flow classes. For example, application A (210-1) includes flow class A (212-1). Flow class A (212-1) captures a signature of the flow modification rules, such as OpenFlow rules, for Application A (210-1) that will be sent to the SDN controller (208). Similarly, application B (210-2) captures flow class B (212-2), application C (210-3) captures flow class C (212-3), and application D (210-4) captures flow class D (212-4).

As illustrated in FIG. 2, the system (200) includes a prioritizing system (202). In one example, the prioritizing system (202) includes a number of engines (204). The engines (204) refer to a combination of hardware and program instructions to perform a designated function. Each of the engines (204) may include a processor and memory. The program instructions are stored in the memory and cause the processor to execute the designated function of the engine.

As illustrated, the prioritizing system (202) includes a registering engine (204-2). The registering engine (204-2) registers flow classes for the application with a SDN controller (208). In this example, the registering engine (204-2) registers flow class A (212-1) for application A (210-1) with the SDN controller (208). Similarly, registering engine (204-2) registers flow class B (212-2) for application B (210-2), flow class C (212-3) for application C (210-3), and flow class D (212-4) for application D (210-4) with the SDN controller (208).

Further, the prioritizing system (202) includes a determining engine (204-3). The determining engine (204-3) determines, with the SDN controller (208), a priority for each of the flow classes (212) based on other installed applications (210) and network services on the SDN controller (208).

For example, the determining engine (204-3) may determine that flow class A (212-1) is to have a high priority based on the other applications (210). As a result, priority A (216-1), which is associated with flow class A (212-1), is given a high priority. In keeping with the given example, the determining engine (204-3) may determine that flow class B (212-2) is to have a medium-high priority. As a result, priority B (216-2), which is associated with flow class B (212-2), is given a medium-high priority. Further, the determining engine (204-3) may determine that flow class C (212-3) is to have a medium-low priority. As a result, priority C (216-3), which is associated with flow class C (212-3), is given a medium-low priority. Further, in this example, the determining engine (204-3) may determine that flow class D (212-4) is to have a low priority. As a result, priority D (216-4), which is associated with flow class D (212-4), is given a low priority.

As illustrated in FIG. 2, prioritizing system (202) includes a sending engine (204-4). The sending engine (204-4) sends the priority keys (214) associated with the priority (216) from the SDN controller (208) to the applications (210). For example, priority key A (214-1), that is associated with priority A (216-1), is sent from the SDN controller (208) to application A (210-1). In this example, priority key A (214-1) may be stored in memory (222) on application A (210-1). Similarly, this process may repeat for priority key B (214-2), priority key C (214-3), and priority key D (214-4).

Further, the prioritizing system (202) includes a receiving engine (204-5). The receiving engine (204-5) receives, from the applications (210), at least one flow modification rule using the priority key (214) as the priority (216). For example, when application A desires to send a request to modify a flow modification rule, the receiving engine (204-5) receives, from application A (210-1), a flow modification rule for flow class A (212-1) using priority key A (214-1) as priority A (216-1). Similarly, this process may repeat for application B (210-2), application C (210-3), and application D (210-4) respectively.

As illustrated, the prioritizing system (202) includes an obtaining engine (204-1). The obtaining engine (204-1) obtains flow classes (212) via priority keys (214). For example, the obtaining engine (204-1) obtains flow class A (212-1) for application A (210-1) via priority key A (214-1). Similarly, the obtaining engine (204-1) obtains flow class B (212-2) for application B (210-2), flow class C (212-3) for application C (210-3), and flow class D (212-4) for application D (210-4) via their priority keys (214-2, 214-3, 214-4 respectively).

As illustrated in FIG. 2, prioritizing system (202) includes a validating engine (204-6). The validating engine (204-6) validates at least one flow modification rule against registered parameters of at least one of the flow classes (212) of the applications (210) to determine a flow of traffic based on the priority (216). In one example, the validating engine (204-6) validates at least one flow modification rule against registered parameters of at least one of the flow classes (212) of the applications (210) to determine a flow of traffic based on the priority (216) by approving the at least one flow modification rule of the applications (210) or prohibiting the at least one flow modification rule of the application (210). In one example, applications A's request for a flow modification rule and application B's request for a flow modification rule is to execute at the same time on the same switch. As mentioned above, application A (210-1) has a higher priority than application B (210-2). As a result, the validating engine (204-6) validates the flow modification rule of application A (210-1) to determine a flow of traffic based on priority A (216-1) by approving the flow modification rule of application A (210-1). Further, the validating engine (204-6) prohibits the flow modification rule of application B (210-2).

In one example, approving the flow modification rule of application A (210-1) includes replacing priority key A (214-1) in the flow modification rule with priority A (216-1) of application A (210-1) to allow the flow modification rule of application (210) to execute at the correct switch. For example, switch one (220-1). In one example, prohibiting flow class B (212-2) of application B (210-2) includes preventing the flow modification rule of application B (210-2) from executing at the correct switch. In this example, switch one (220-1). However, the flow modification rule of application B (210-2) may execute after the flow modification rule of application A (210-1) has finished.

Figure 3:
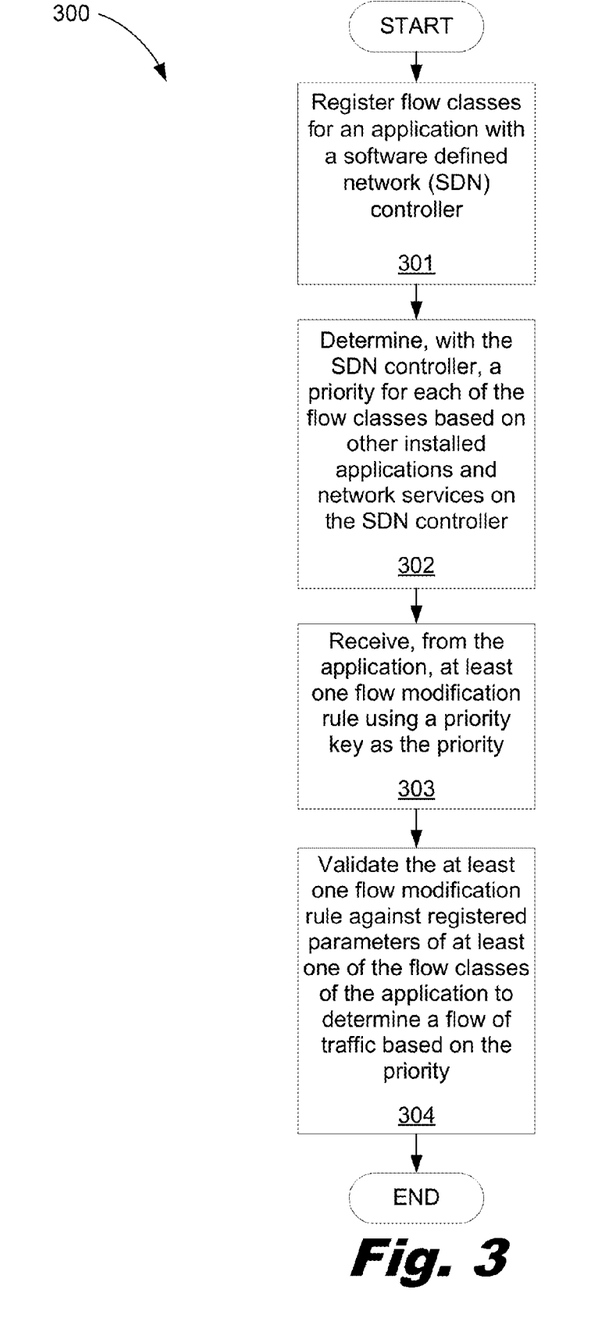
FIG. 3 is a flowchart of an example of a method for prioritizing at least one flow class for an application on a SDN controller, according to one example of principles described herein.

FIG. 3 is a flowchart of an example of a method for prioritizing at least one flow class for an application on a SDN controller, according to one example of principles described herein. In one example, the method (300) may be executed by the system (100) of FIG. 1. In other examples, the method (300) may be executed by other systems such as system 500 or system 600. In this example, the method (300) includes registering (301) flow classes for an application with a SDN controller, determining (302), with the SDN controller, a priority for each of the flow classes based on other installed applications and network services on the SDN controller, receiving (303), from the application, at least one flow modification rule using a priority key as the priority, and validating (304) the at least one flow modification rule against registered parameters of at least one of the flow classes of the application to determine a flow of traffic based on the priority.

As mentioned above, the method (300) includes registering (301) flow classes for an application with a SDN controller. As mentioned above, a number of applications may be installed on a SDN controller. In one example, the once the applications are installed on the SDN controller, a registering engine automatically registers at least one flow class for each of the applications on the SDN controller. In another example, once the applications are installed on the SDN controller, a registering engine provides a user interface (UI) to a user to allow the user to register the flow classes for each of the applications. In this example the UI may include text boxes to allow the user to input the flow class for each of the applications. Further, in other example, other methods and techniques may be used to register at least one flow class for an application with the SDN controller. By registering at least one flow class for each of the applications with the SDN controller, the applications may be able to account for each other's business logic. As mentioned above, in other examples, the method (300) allows flow classes for applications not installed directly on the SDN controller to be registered with the SDN controller.

As mentioned above, the method (300) includes determining (302), with the SDN controller, a priority for each of the flow classes based on other installed applications and network services on the SDN controller. In one example, a determining engine is used to determine a priority for each of the flow classes associated with the applications.

As mentioned above, the priority may be used to determine an order of evaluation for flow modification rules at a switch. For example, the higher the priority the earlier the flow modification rules is executed at the switch. In one example, the priority may be a range from 0 to 10, where 0 indicates the lowest priority and 10 indicates the highest priority. In another example, the priority may be expressed symbolically. For example, a priority with the lowest significance may be assigned a low priority. A priority with the highest significance may be assigned a high priority.

As a result, each of the application's flow classes may be assigned a priority that will not conflict with another application's priority when a request for a flow modification rule is made. Further, the request may be made as a flow modification message.

As mentioned above, the method (300) includes receiving (303), from the application, at least one flow modification rule using a priority key as the priority. As mentioned above, the priority key may be a ticket that the application includes when sending a request for a flow modification rule. In one example, the priority key may be used to identify a flow class, identify a user who owns a particular flow class, lookup appropriate metadata, or combinations thereof. In one example, the priority key may be included in a priority field of a request.

As mentioned above, the method (300) includes validating (304) the at least one flow modification rule against registered parameters of at least one of the flow classes of the application to determine a flow of traffic based on the priority. In one example, a validating engine may be used to validate the at least one flow modification rule against registered parameters of at least one of the flow classes of the application to determine the flow of the traffic based on the priority. In this example, the validating engine approves the at least one flow modification rule of the application or prohibits the at least one flow modification rule of the application. In one example, the validating engine compares the requested flow modification rule with the flow class to determine if the flow modification rule is to be approved or prohibited.

If the flow modification rule is approved, the validating engine replaces the priority key in the flow modification rule with the priority of the application to allow the at least one flow modification rule of the application to execute at the correct switch. In this example, the correct switch may be the intended switch in the SDN network. In this example, the validating engine replaces the priority key in the flow modification rule with the priority of the application to allow the at least one flow modification rule of the application to execute at the correct switch before sending the flow modification rule to the correct switch.

If the flow modification rule is prohibited, the validating engine prevents the at least one flow modification rule of the application from executing at the correct switch. In one example, the validating engine prevents the at least one flow modification rule of the application from executing at the correct switch by not allowing the SDN controller to forward the flow modification rule to the correct switch.

Figure 4:
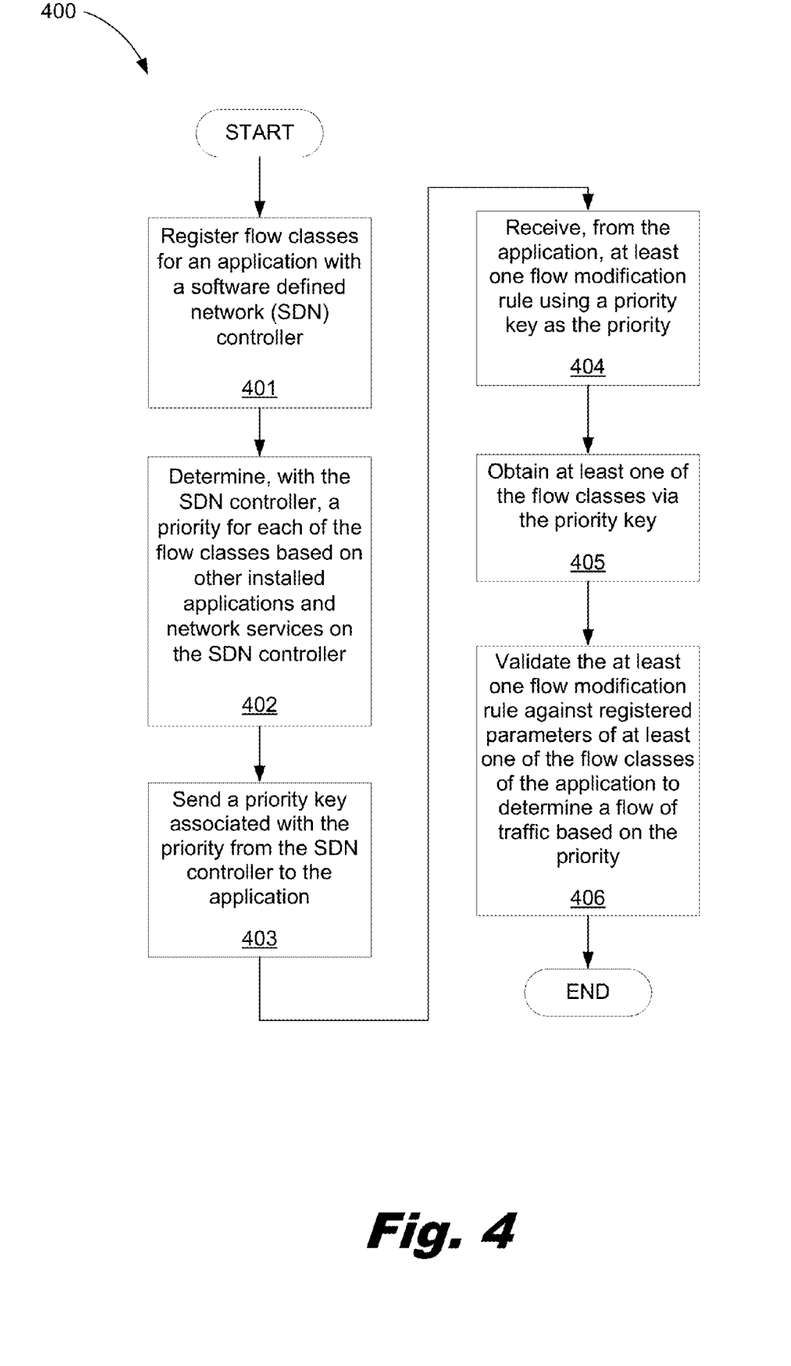
FIG. 4 is a flowchart of an example of a method for prioritizing at least one flow class for an application on a SDN controller, according to one example of principles described herein.

FIG. 4 is a flowchart of an example of a method for prioritizing at least one flow class for an application on a SDN controller, according to one example of principles described herein. In one example, the method (400) may be executed by the system (100) of FIG. 1. In other examples, the method (400) may be executed by other systems such as system 500 or system 600. In this example, the method (400) includes registering (401) flow classes for the application with a SDN controller, determining (402), with the SDN controller, a priority for each of the flow classes based on other installed applications and network services on the SDN controller, sending (403) the priority key associated with the priority from the SDN controller to the application, receiving (404), from the application, at least one flow modification rule using a priority key as the priority, obtaining (405) at least one of the flow classes via the priority key, and validating (406) the at least one flow modification rule against registered parameters of at least one of the flow classes of the application to determine a flow of traffic based on the priority.

As mentioned above, the method (400) includes sending (403) the priority key associated with the priority from the SDN controller to the application. As mentioned above, the method (400) determines, with the SDN controller, the priority for the at least one flow class based on other installed applications and network services on the SDN controller. Once the priority for the at least one flow class based on other installed applications and network services on the SDN controller is determined, the priority key associated with the priority is sent from the SDN controller to the application. As a result, when an application sends a request, the application includes the priority key in the request.

As mentioned above, the method (400) includes obtaining (405) at least one of the flow classes via the priority key. In one example, an obtaining engine obtains at least one of the flow classes via the priority key when a flow modification request is made. For example, if four applications, namely application A, application B, application C, and application D, are installed on the SDN controller, the obtaining engine obtains a flow class for application A via the priority key for application A, a flow class for application B via the priority key for application B, a flow class for application C via the priority key for application C, and a flow class for application D via the priority key for application D.

Figure 5:
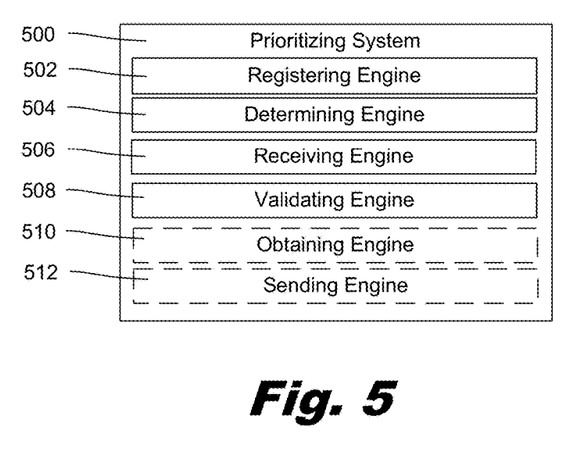
FIG. 5 is a diagram of an example of a prioritizing system, according to one example of principles described herein.

FIG. 5 is a diagram of an example of a prioritizing system, according to one example of principles described herein. The prioritizing system (500) includes a registering engine (502), a determining engine (504), a receiving engine (506), and a validating engine (508). In this example, the prioritizing system (500) also includes an obtaining engine (510) and a sending engine (512). The engines (502, 504, 506, 508, 510, 512) refer to a combination of hardware and program instructions to perform a designated function. Each of the engines (502, 504, 506, 508, 510, 512) may include a processor and memory. The program instructions are stored in the memory and cause the processor to execute the designated function of the engine.

The registering engine (502) registers flow classes for an application with a SDN controller. In one example, the registering engine (502) registers one flow class for the application with the SDN controller. In another example, the registering engine (502) registers several flow classes for the application with the SDN controller.

The determining engine (504) determine, with the SDN controller, a priority for each of the flow classes based on other installed applications and network services on the SDN controller. In one example, the determining engine (504) determine, with the SDN controller, one priority for the flow class based on other installed applications and network services on the SDN controller.

The receiving engine (506) receives, from the application, at least one flow modification rule using the priority key as the priority. In one example, the receiving engine (506) receives, from several applications, several flow modification rules using several priority keys as the priorities.

The validating engine (508) validates the at least flow modification rule against registered parameters of at least one of the flow classes of the application to determine a flow of traffic based on the priority. In one example, the validating engine (508) validates several flow modification rules of the applications to determine a flow of traffic based on several priorities. In one example, the validating engine (508) validates a flow modification rule against registered parameters of at least one of the flow classes of the application to determine the flow of the traffic based on the priority by approving at least one flow modification rule of the application or prohibiting at least one flow modification rule of the application. In one example, approving at least one flow modification rule of the application includes replacing the priority key in the flow modification rule with the priority of the application to allow the at least one flow modification rule of the application to execute at a switch. Further, prohibiting the at least one flow modification rule of the application includes preventing at least one flow modification rule of the application from executing at a switch.

The obtaining engine (510) obtains flow classes via a priority key. In one example, the obtaining engine (510) obtains one flow class for the application via a priority key. In another example, the obtaining engine (510) obtains several flow classes for the application via priority keys.

The sending engine (512) sends a priority key associated with the priority from the SDN controller to the application. In one example, the sending engine (512) sends one priority key associated with the priority from the SDN controller to the application. In another example, the sending engine (512) sends several priority keys associated with the priorities from the SDN controller to the applications.

Figure 6:
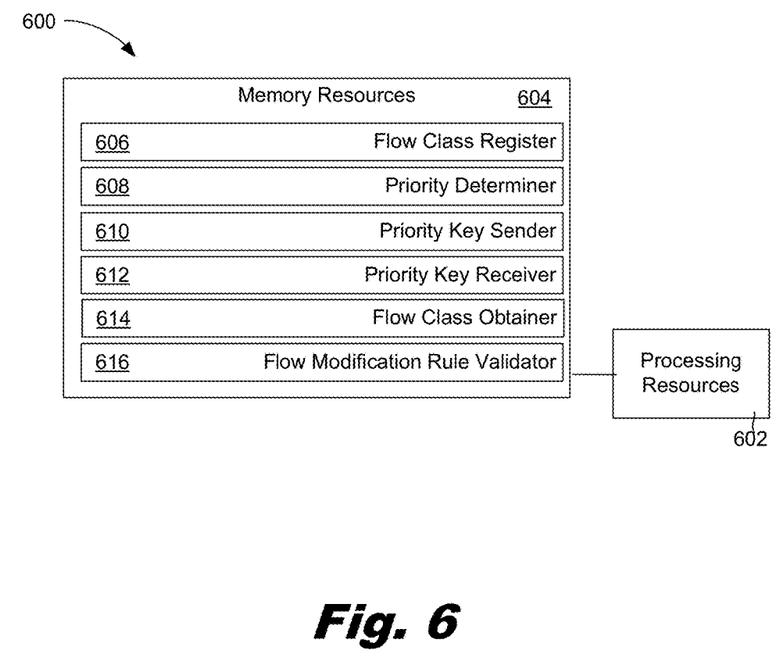
FIG. 6 is a diagram of an example of a prioritizing system, according to one example of principles described herein.

FIG. 6 is a diagram of an example of a prioritizing system, according to one example of principles described herein. In this example, prioritizing system (600) includes processing resources (602) that are in communication with memory resources (604). Processing resources (602) include at least one processor and other resources used to process programmed instructions. The memory resources (604) represent generally any memory capable of storing data such as programmed instructions or data structures used by the prioritizing system (600). The programmed instructions shown stored in the memory resources (604) include a flow class register (606), a priority determiner (608), a priority key sender (610), a priority key receiver (612), a flow class obtainer (614), and a flow modification rule validator (616).

The memory resources (604) include a computer readable storage medium that contains computer readable program code to cause tasks to be executed by the processing resources (602). The computer readable storage medium may be tangible and/or physical storage medium. The computer readable storage medium may be any appropriate storage medium that is not a transmission storage medium. A non-exhaustive list of computer readable storage medium types includes non-volatile memory, volatile memory, random access memory, write only memory, flash memory, electrically erasable program read only memory, or types of memory, or combinations thereof.

The flow class register (606) represents programmed instructions that, when executed, cause the processing resources (602) to register the flow classes for the application with a SDN controller. The priority determiner (608) represents programmed instructions that, when executed, cause the processing resources (602) to determine, with the SDN controller, a priority for each of the flow classes based on other installed applications and network services on the SDN controller.

The priority key sender (610) represents programmed instructions that, when executed, cause the processing resources (602) to send a priority key associated with the priority from the SDN controller to the application. The priority key receiver (612) represents programmed instructions that, when executed, cause the processing resources (602) to receive, from the application, at least one flow modification rule using the priority key as the priority.

The flow class obtainer (614) represents programmed instructions that, when executed, cause the processing resources (602) to obtain flow classes via a priority key. The flow modification rule validator (616) represents programmed instructions that, when executed, cause the processing resources (602) to validate the at least one flow modification rule against registered parameters of at least one of the flow classes of the application to determine a flow of traffic based on the priority.

Further, the memory resources (604) may be part of an installation package. In response to installing the installation package, the programmed instructions of the memory resources (604) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (602) and the memory resources (602) are located within the same physical component, such as a server, or a network component. The memory resources (604) may be part of the physical component's main memory, caches, registers, non-volatile memory, or elsewhere in the physical component's memory hierarchy. Alternatively, the memory resources (604) may be in communication with the processing resources (602) over a network. Further, the data structures, such as the libraries, may be accessed from a remote location over a network connection while the programmed instructions are located locally. Thus, the prioritizing system (600) may be implemented on a user device, on a server, on a collection of servers, or combinations thereof.

The prioritizing system (600) of FIG. 6 may be part of a general purpose computer. However, in alternative examples, the prioritizing system (600) is part of an application specific integrated circuit.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method for prioritizing at least one flow class for an application on a software defined networking (SDN) controller, the method comprising:
    registering flow classes for the application with a software defined networking (SDN) controller, wherein the flow classes comprise a description of flow modification rules and a priority at which the flow modification rules are to be installed at a switch;
    determining, with the SDN controller, a priority for each of the flow classes based on other installed applications and network services on the SDN controller;
    receiving, from the application, at least one flow modification rule using a priority key as the priority; and
    validating the at least one flow modification rule against registered parameters of at least one of the flow classes of the application to determine a flow of traffic based on the priority.

2. The method of claim 1, in which validating the at least one flow modification rule against the registered parameters of at least one of the flow classes of the application to determine the flow of the traffic based on the priority comprises approving the at least one flow modification rule of the application or prohibiting the at least one flow modification rule of the application.

3. The method of claim 2, in which approving the at least one flow modification rule of the application comprises replacing the priority key in the at least one flow modification rule with the priority of the application to allow the at least one flow modification rule of the application to execute at a switch.

4. The method of claim 2, in which prohibiting the at least one flow modification rule of the application comprises preventing the at least one flow modification rule of the application from executing at a switch.

5. The method of claim 1, further comprising sending the priority key associated with the priority from the SDN controller to the application.

6. The method of claim 1, further comprising obtaining the at least one of the flow classes via the priority key.

7. The method of claim 1, wherein the determining of the priority for each of the flow classes is to occur prior to the receipt, from the application, of the at least one flow modification rule that uses the priority key as the priority.

8. A system for prioritizing at least one flow class for an application on a software defined networking (SDN) controller, the system comprising:
    a registering engine to register flow classes for the application with a software defined networking (SDN) controller, wherein the flow classes comprise a description of flow modification rules and a priority at which the flow modification rules are to be installed at a switch;
    a determining engine to determine, with the SDN controller, a priority for each of the flow classes based on other installed applications and network services on the SDN controller; a sending engine to send a priority key associated with the priority from the SDN controller to the application;
    a receiving engine to receive, from the application, at least one flow modification rule using the priority key as the priority;
    an obtaining engine to obtain at least one of the flow classes via the priority key; and
    a validating engine to validate the at least one flow modification rule against registered parameters of the at least one of the flow classes of the application to determine a flow of traffic based on the priority.

9. The system of claim 8, in which the validating engine validates the at least one flow modification rule against the registered parameters of at least one of the flow classes of the application to determine the flow of the traffic based on the priority by approving the at least one flow modification rule of the application or prohibiting the at least one flow modification rule of the application.

10. The system of claim 9, in which approving the at least one flow modification rule of the application comprises replacing the priority key in the flow modification rule with the priority of the application to allow the at least one flow modification rule of the application to execute at a switch.

11. The system of claim 9, in which prohibiting the at least one flow modification rule of the application comprises preventing the at least one flow modification rule of the application from executing at a switch.

12. The system of claim 8, wherein the determining of the priority for each of the flow classes is to occur prior to the receipt, from the application, of the at least one flow modification rule that uses the priority key as the priority.

13. A computer program product for prioritizing at least one flow class for an application on a software defined networking (SDN) controller, comprising:
    a non-transitory tangible computer readable storage medium, the tangible computer readable storage medium comprising computer readable program code embodied therewith, the computer readable program code comprising program instructions that, when executed, causes a processor to:
    register flow classes for the application with a software defined networking (SDN) controller, wherein the flow classes comprise a description of flow modification rules and a priority at which the flow modification rules are to be installed at a switch;

determine, with the SDN controller, a priority for each of the flow classes based on other installed applications and network services on the SDN controller;

obtain at least one of the flow classes via a priority key; and validate at least one flow modification rule against registered parameters of at the least one of the flow classes of the application to determine a flow of traffic based on the priority.

14. The product of claim 13, further comprising computer readable program code comprising program instructions that, when executed, cause the processor to send the priority key associated with the priority from the SDN controller to the application.

15. The product of claim 13, further comprising computer readable program code comprising program instructions that, when executed, cause the processor to receive, from the application, the at least one flow modification rule using the priority key as the priority.

16. The product of claim 13, further comprising computer readable program code comprising program instructions that, when executed, cause the processor to approve the at least one flow modification rule of the application by replacing in the flow modification rule the priority key with the priority of the application to allow the at least one flow modification rule of the application to execute at a switch.

17. The product of claim 13, further comprising computer readable program code comprising program instructions that, when executed, cause the processor to prohibit the at least one flow modification rule of the application by preventing the at least one flow modification rule of the application from executing at a switch.

18. The product of claim 13, wherein the determining of the priority for each of the flow classes is to occur prior to receipt of the at least one flow modification rule by computer program product that uses the priority key as the priority.

\* \* \* \* \*